(12) United States Patent
Milby

(10) Patent No.: US 11,681,675 B1
(45) Date of Patent: Jun. 20, 2023

(54) UNBOUNDED ANALYTIC FRAMEWORK IN A DATA STORE SYSTEM

(71) Applicant: Teradata US, Inc., San Diego, CA (US)

(72) Inventor: Gregory Howard Milby, San Marcos, CA (US)

(73) Assignee: Teradata US, Inc., San Diego, CA (US)

( * ) Notice: Subject to any disclaimer, the term of this patent is extended or adjusted under 35 U.S.C. 154(b) by 163 days.

(21) Appl. No.: 17/139,917

(22) Filed: Dec. 31, 2020

Related U.S. Application Data

(60) Provisional application No. 62/955,902, filed on Dec. 31, 2019.

(51) Int. Cl.
   | | |
   |---|---|
   | *G06F 16/00* | (2019.01) |
   | *G06F 16/22* | (2019.01) |
   | *G06F 16/2458* | (2019.01) |
   | *G06F 11/34* | (2006.01) |
   | *G06F 16/2457* | (2019.01) |
   | *G06F 16/2453* | (2019.01) |

(52) U.S. Cl.
   CPC ........ *G06F 16/221* (2019.01); *G06F 11/3409* (2013.01); *G06F 16/2228* (2019.01); *G06F 16/2465* (2019.01); *G06F 16/24542* (2019.01); *G06F 16/24578* (2019.01)

(58) Field of Classification Search
   None
   See application file for complete search history.

(56) References Cited

U.S. PATENT DOCUMENTS

| | | | | |
|---|---|---|---|---|
| 7,882,219 | B2* | 2/2011 | Pikovsky | ............ H04L 41/0233 |
| | | | | 709/224 |
| 7,996,387 | B2* | 8/2011 | Das | ........................ G06F 16/22 |
| | | | | 707/718 |
| 9,355,145 | B2* | 5/2016 | George | ............. G06F 16/24542 |
| 10,282,216 | B2* | 5/2019 | Poon | ..................... G06F 9/4484 |
| 10,346,375 | B2* | 7/2019 | Chen | ..................... G06F 16/217 |

\* cited by examiner

*Primary Examiner* — Debbie M Le
(74) *Attorney, Agent, or Firm* — Randy L. Campbell, Jr.

(57) ABSTRACT

A data store system may include a storage device configured to store a plurality of data store tables. The data store may further include a plurality of processing units. At least one processing unit from the plurality of processing units may receive an analytic function call. The at least one processing unit may further identify, in the analytic function call, at least one column of a data store table on which to execute an analytic function in the analytic function call and may further identify, in the analytic function call, an identifier column of the data store table. Each row of the at least one column may be associated with a common row value of the identifier column. The at least one processing unit may further identify, in the analytic function call, at least one index column of the data store table. Each value in each at the least one index column may identify an index value on which to index each value of the at least one column with respect to each value of the identifier column. The at least one processing unit may further order values of the at least one column in accordance with the identifier column and the at least one index column, execute the analytic function on the ordered values to generate a result set, and order the result set in accordance with the identifier column and the at least one index column. A computer-readable medium and method are also disclosed.

20 Claims, 16 Drawing Sheets

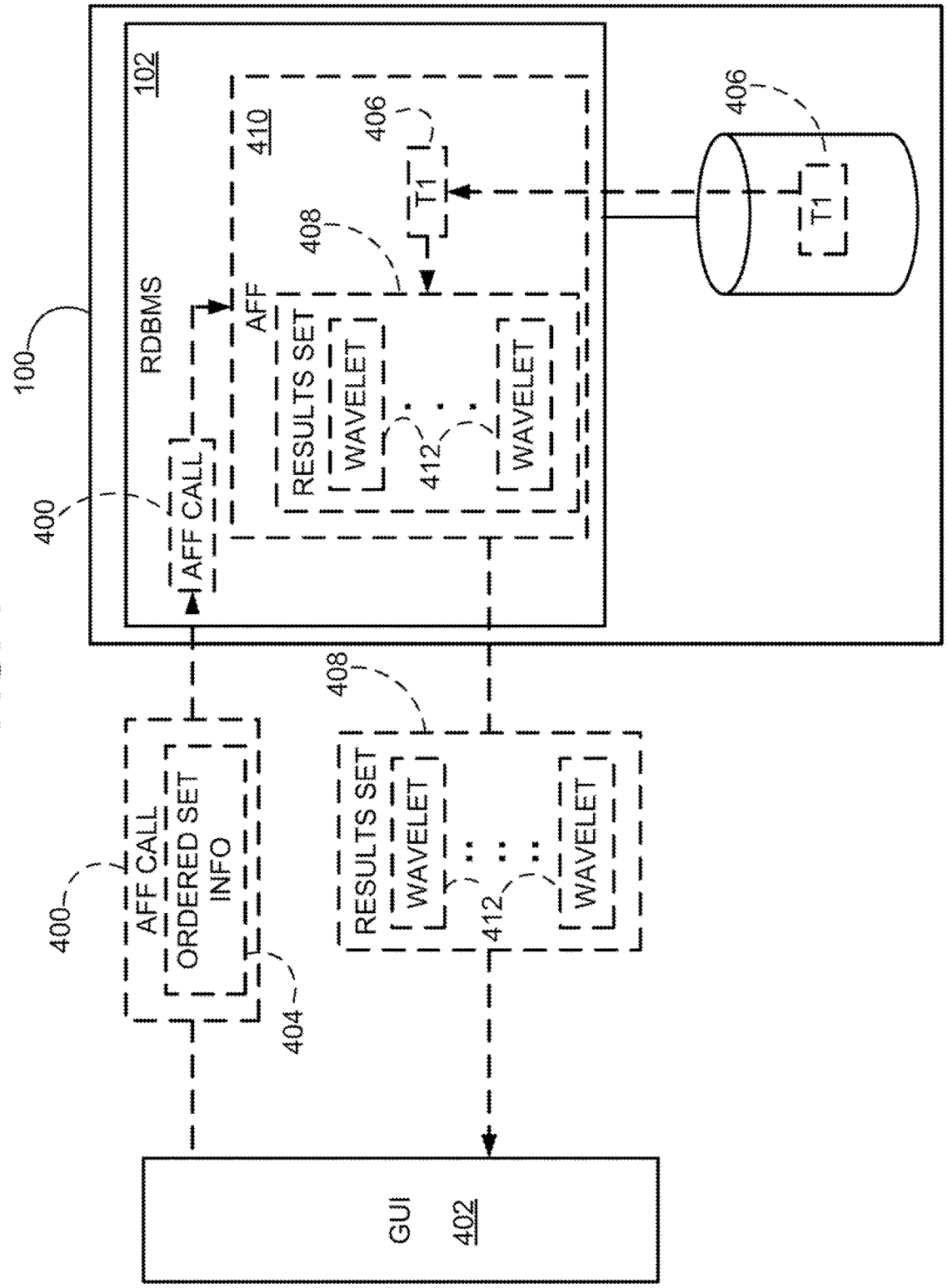

FIG. 5A

| DataSetID | SeqNo | TimeValue | Magnitude |
|---|---|---|---|
| 60 | 1 | 2014-01-06 08:01:00.000000+00:00 | 8.70000000000000E 001 |
| 61 | 1 | 2014-01-06 08:01:00.000000+00:00 | 1.03000000000000E 002 |
| 62 | 1 | 2014-01-06 08:01:00.000000+00:00 | 1.32000000000000E 002 |
| 63 | 1 | 2014-01-06 08:01:00.000000+00:00 | 1.26000000000000E 002 |
| 64 | 1 | 2014-01-06 08:01:00.000000+00:00 | 1.74000000000000E 002 |
| 60 | 2 | 2014-01-06 08:02:00.000000+00:00 | 8.30000000000000E 001 |
| 61 | 2 | 2014-01-06 08:02:00.000000+00:00 | 1.13000000000000E 002 |
| 62 | 2 | 2014-01-06 08:02:00.000000+00:00 | 1.40000000000000E 002 |
| 63 | 2 | 2014-01-06 08:02:00.000000+00:00 | 1.33000000000000E 002 |
| 64 | 2 | 2014-01-06 08:02:00.000000+00:00 | 1.75000000000000E 002 |
| 60 | 3 | 2014-01-06 08:03:00.000000+00:00 | 8.50000000000000E 001 |
| 61 | 3 | 2014-01-06 08:03:00.000000+00:00 | 1.25000000000000E 002 |
| 62 | 3 | 2014-01-06 08:03:00.000000+00:00 | 1.48000000000000E 002 |
| 63 | 3 | 2014-01-06 08:03:00.000000+00:00 | 1.38000000000000E 002 |
| 64 | 3 | 2014-01-06 08:03:00.000000+00:00 | 1.71000000000000E 002 |
| 60 | 4 | 2014-01-06 08:04:00.000000+00:00 | 8.60000000000000E 001 |
| 61 | 4 | 2014-01-06 08:04:00.000000+00:00 | 1.37000000000000E 002 |
| 62 | 4 | 2014-01-06 08:04:00.000000+00:00 | 1.51000000000000E 002 |
| 63 | 4 | 2014-01-06 08:04:00.000000+00:00 | 1.41000000000000E 002 |
| 64 | 4 | 2014-01-06 08:04:00.000000+00:00 | 1.72000000000000E 002 |
| 60 | 5 | 2014-01-06 08:05:00.000000+00:00 | 8.30000000000000E 001 |
| 61 | 5 | 2014-01-06 08:05:00.000000+00:00 | 1.47000000000000E 002 |
| 62 | 5 | 2014-01-06 08:05:00.000000+00:00 | 1.49000000000000E 002 |
| 63 | 5 | 2014-01-06 08:05:00.000000+00:00 | 1.43000000000000E 002 |
| 64 | 5 | 2014-01-06 08:05:00.000000+00:00 | 1.74000000000000E 002 |
| 60 | 6 | 2014-01-06 08:06:00.000000+00:00 | 8.60000000000000E 001 |
| 61 | 6 | 2014-01-06 08:06:00.000000+00:00 | 1.52000000000000E 002 |
| 62 | 6 | 2014-01-06 08:06:00.000000+00:00 | 1.45000000000000E 002 |
| 63 | 6 | 2014-01-06 08:06:00.000000+00:00 | 1.51000000000000E 002 |
| 64 | 6 | 2014-01-06 08:06:00.000000+00:00 | 1.75000000000000E 002 |

500

| DataSetID | SeqNo | TimeValue | Magnitude |
|---|---|---|---|
| 60 | 7 | 2014-01-06 08:07:00.000000+00:00 | 8.400000000000000E 001 |
| 61 | 7 | 2014-01-06 08:07:00.000000+00:00 | 1.500000000000000E 002 |
| 62 | 7 | 2014-01-06 08:07:00.000000+00:00 | 1.410000000000000E 002 |
| 63 | 7 | 2014-01-06 08:07:00.000000+00:00 | 1.610000000000000E 002 |
| 64 | 7 | 2014-01-06 08:07:00.000000+00:00 | 1.700000000000000E 002 |
| 60 | 8 | 2014-01-06 08:08:00.000000+00:00 | 8.600000000000000E 001 |
| 61 | 8 | 2014-01-06 08:08:00.000000+00:00 | 1.480000000000000E 002 |
| 62 | 8 | 2014-01-06 08:08:00.000000+00:00 | 1.340000000000000E 002 |
| 63 | 8 | 2014-01-06 08:08:00.000000+00:00 | 1.670000000000000E 002 |
| 64 | 8 | 2014-01-06 08:08:00.000000+00:00 | 1.660000000000000E 002 |
| 60 | 9 | 2014-01-06 08:09:00.000000+00:00 | 8.800000000000000E 001 |
| 61 | 9 | 2014-01-06 08:09:00.000000+00:00 | 1.460000000000000E 002 |
| 62 | 9 | 2014-01-06 08:09:00.000000+00:00 | 1.300000000000000E 002 |
| 63 | 9 | 2014-01-06 08:09:00.000000+00:00 | 1.700000000000000E 002 |
| 64 | 9 | 2014-01-06 08:09:00.000000+00:00 | 1.550000000000000E 002 |
| 60 | 10 | 2014-01-06 08:10:00.000000+00:00 | 8.900000000000000E 001 |
| 61 | 10 | 2014-01-06 08:10:00.000000+00:00 | 1.480000000000000E 002 |
| 62 | 10 | 2014-01-06 08:10:00.000000+00:00 | 1.310000000000000E 002 |
| 63 | 10 | 2014-01-06 08:10:00.000000+00:00 | 1.710000000000000E 002 |
| 64 | 10 | 2014-01-06 08:10:00.000000+00:00 | 1.420000000000000E 002 |
| 60 | 11 | 2014-01-06 08:11:00.000000+00:00 | 9.200000000000000E 001 |
| 61 | 11 | 2014-01-06 08:11:00.000000+00:00 | 1.440000000000000E 002 |
| 62 | 11 | 2014-01-06 08:11:00.000000+00:00 | 1.280000000000000E 002 |
| 63 | 11 | 2014-01-06 08:11:00.000000+00:00 | 1.730000000000000E 002 |
| 64 | 11 | 2014-01-06 08:11:00.000000+00:00 | 1.320000000000000E 002 |
| 60 | 12 | 2014-01-06 08:12:00.000000+00:00 | 9.900000000000000E 001 |
| 61 | 12 | 2014-01-06 08:12:00.000000+00:00 | 1.330000000000000E 002 |
| 62 | 12 | 2014-01-06 08:12:00.000000+00:00 | 1.250000000000000E 002 |
| 63 | 12 | 2014-01-06 08:12:00.000000+00:00 | 1.720000000000000E 002 |
| 64 | 12 | 2014-01-06 08:12:00.000000+00:00 | 1.230000000000000E 002 |

| DataSetID | SeqNo | Magnitude |
|---|---|---|
| 60 | 1 | 8.7000000000000E 001 |
| 60 | 2 | 8.3000000000000E 001 |
| 60 | 3 | 8.5000000000000E 001 |
| ... | ... | ... |
| 60 | 12 | 9.9000000000000E 001 |
| 61 | 1 | 1.0300000000000E 002 |
| ... | ... | ... |
| 61 | 12 | 1.3300000000000E 002 |
| 62 | 1 | 1.3200000000000E 002 |
| ... | ... | ... |
| 62 | 12 | 1.2500000000000E 002 |
| 63 | 1 | 1.2600000000000E 002 |
| ... | ... | ... |
| 63 | 12 | 1.7200000000000E 002 |
| 64 | 1 | 1.7400000000000E 002 |
| ... | ... | ... |
| 64 | 11 | 1.3200000000000E 002 |
| 64 | 12 | 1.2300000000000E 002 |

FIG. 7

| DataSetID | TimeValue | Magnitude |
|---|---|---|
| 60 | 2014-01-06 08:01:00.000000+00:00 | 8.700000000000000E 001 |
| 60 | 2014-01-06 08:02:00.000000+00:00 | 8.300000000000000E 001 |
| ⋮ | ⋮ | ⋮ |
| 60 | 2014-01-06 08:12:00.000000+00:00 | 9.900000000000000E 001 |
| 61 | 2014-01-06 08:01:00.000000+00:00 | 1.030000000000000E 002 |
| ⋮ | ⋮ | ⋮ |
| 61 | 2014-01-06 08:12:00.000000+00:00 | 1.330000000000000E 002 |
| 62 | 2014-01-06 08:01:00.000000+00:00 | 1.320000000000000E 002 |
| ⋮ | ⋮ | ⋮ |
| 62 | 2014-01-06 08:12:00.000000+00:00 | 1.250000000000000E 002 |
| 63 | 2014-01-06 08:01:00.000000+00:00 | 1.260000000000000E 002 |
| ⋮ | ⋮ | ⋮ |
| 63 | 2014-01-06 08:12:00.000000+00:00 | 1.720000000000000E 002 |
| 64 | 2014-01-06 08:01:00.000000+00:00 | 1.740000000000000E 002 |
| ⋮ | ⋮ | ⋮ |
| 64 | 2014-01-06 08:11:00.000000+00:00 | 1.320000000000000E 002 |
| 64 | 2014-01-06 08:12:00.000000+00:00 | 1.230000000000000E 002 |

FIG. 8

| DataSetID | RPW_I | COEFF_NAME | COEFF_VALUE |
|---|---|---|---|
| 60 | 1 | B | 8.146969696970E-001 |
| 60 | 2 | M | 9.020979020979E-01 |
| 61 | 1 | B | 1.186212121212E-002 |
| 61 | 2 | M | 2.853146853147E 000 |
| 62 | 1 | B | 1.482424242424E-002 |
| 62 | 2 | M | -1.601398601399E 000 |
| 63 | 1 | B | 1.237424242424E-002 |
| 63 | 2 | M | 4.629370629371E 000 |
| 64 | 1 | B | 1.895000000000E-002 |
| 64 | 2 | M | -4.423076923077E 000 |

800 ← 802 (bracket markers)

FIG. 9

| DataSetID | ROW_I | STD_ERROR2 | S_E_DF | MULT_R_SQUARED | ADJ_R_SQUARED | F_STATISTIC | EX_DF | UNEX_DF | PROB_VALUE |
|---|---|---|---|---|---|---|---|---|---|
| 60 | 0 | 3.229449701143E 000 | 10 | 6.273593475010357E-001 | 4.800962823614E-001 | 1.157722936776E 001 | 1 | 10 | 7.464935493359E-003 |
| 61 | 0 | 1.262378749175E-001 | 10 | 4.221264049627155E-001 | 3.643392545834E-001 | 7.304825105387E 000 | 1 | 10 | 2.208528644869E-003 |
| 62 | 0 | 7.203793352326E 000 | 10 | 4.410621868030138E-001 | 3.854674185351616E-001 | 7.066631331899E 000 | 1 | 10 | 2.396846782757E-003 |
| 63 | 0 | 4.037614540784E 000 | 10 | 4.949180023036E-001 | 9.444410902533E-001 | 1.879383463846E 002 | 1 | 10 | 2.651801872731E-008 |
| 64 | 0 | 9.698731082743E 000 | 10 | 7.463705363659E-001 | 7.232075886367E-001 | 2.940973954287E 001 | 1 | 10 | 2.794630874825E-004 |

| DataSetID | ROW_I | X1 | ACTUAL_VALUE | CALC_VALUE | RESIDUAL |
|---|---|---|---|---|---|
| 60 | 0 | 1.00000000000000E 000 | 8.70000000000000E 001 | 8.23717948717949E 001 | 4.62820512820508E 000 |
| 60 | 1 | 2.00000000000000E 000 | 8.30000000000000E 001 | 8.32738927738928E 001 | -2.73892773892825E -001 |
| 60 | 2 | 3.00000000000000E 000 | 8.50000000000000E 001 | 8.41759906759907E 001 | 0.82400093240092282E 001 |
| 60 | 3 | 4.00000000000000E 000 | 8.60000000000000E 001 | 8.50780885780886E 001 | 0.09219114219113890E 000 |
| 60 | 4 | 5.00000000000000E 000 | 8.30000000000000E 001 | 8.59801864801865E 001 | -2.98018648018652E 000 |
| 60 | 5 | 6.00000000000000E 000 | 8.60000000000000E 001 | 8.68822843822844E 001 | -8.82284382284411E 001 |
| 60 | 6 | 7.00000000000000E 000 | 8.40000000000000E 001 | 8.77843822843823E 001 | -3.78438228438230E 000 |
| 60 | 7 | 8.00000000000000E 000 | 8.60000000000000E 001 | 8.86864801864802E 001 | -2.68648018648021E 000 |
| 60 | 8 | 9.00000000000000E 000 | 8.80000000000000E 001 | 8.95885780885781E 001 | -1.58857808857810E 000 |
| 60 | 9 | 1.00000000000000E 001 | 8.90000000000000E 001 | 9.04906759906760E 001 | -1.49067599067600E 000 |
| 60 | 10 | 1.10000000000000E 001 | 9.20000000000000E 001 | 9.13927738927739E 001 | 6.07226107226097E-01 |
| 60 | 11 | 1.20000000000000E 001 | 9.90000000000000E 001 | 9.22948717948718E 001 | 6.70512820512820E 000 |
| 61 | 0 | 1.00000000000000E 000 | 1.03000000000000E 002 | 1.21474358974359E 002 | -1.84743589743590E 001 |
| 61 | 1 | 2.00000000000000E 000 | 1.13000000000000E 002 | 1.24327505827506E 002 | -1.13275058275059E 001 |
| 61 | 2 | 3.00000000000000E 000 | 1.25000000000000E 002 | 1.27180652680653E 002 | -2.18065268065273E 000 |
| 61 | 3 | 4.00000000000000E 000 | 1.37000000000000E 002 | 1.30033799533800E 002 | 6.96620046620043E 000 |
| 61 | 4 | 5.00000000000000E 000 | 1.47000000000000E 002 | 1.32886946386946E 002 | 1.41130536130536E 001 |
| 61 | 5 | 6.00000000000000E 000 | 1.52000000000000E 002 | 1.35740093240093E 002 | 1.62599067599067E 001 |
| 61 | 6 | 7.00000000000000E 000 | 1.50000000000000E 002 | 1.38593240093240E 002 | 1.14067599067599E 001 |
| 61 | 7 | 8.00000000000000E 000 | 1.48000000000000E 002 | 1.41446386946387E 002 | 6.55361305361305E 000 |
| 61 | 8 | 9.00000000000000E 000 | 1.46000000000000E 002 | 1.44299533799534E 002 | 1.70046620046620E 000 |
| 61 | 9 | 1.00000000000000E 001 | 1.48000000000000E 002 | 1.47152680652681E 002 | 8.47319347319342E-001 |
| 61 | 10 | 1.10000000000000E 001 | 1.44000000000000E 002 | 1.50005827505828E 002 | -6.00582750582751E 000 |
| 61 | 11 | 1.20000000000000E 001 | 1.33000000000000E 002 | 1.52858974358974E 002 | -1.98589743589743E 001 |
| 62 | 0 | 1.00000000000000E 000 | 1.32000000000000E 002 | 1.46641025641026E 002 | -1.46410256410257E 001 |
| 62 | 1 | 2.00000000000000E 000 | 1.40000000000000E 002 | 1.45039627039627E 002 | -5.03962703962708E 000 |
| 62 | 2 | 3.00000000000000E 000 | 1.48000000000000E 002 | 1.43438228438228E 002 | 4.56177156177151E 000 |
| 62 | 3 | 4.00000000000000E 000 | 1.51000000000000E 002 | 1.41836829836830E 002 | 9.16317016317012E 000 |
| 62 | 4 | 5.00000000000000E 000 | 1.49000000000000E 002 | 1.40235431235431E 002 | 8.76456874456874E 000 |
| 62 | 5 | 6.00000000000000E 000 | 1.45000000000000E 002 | 1.38634032634033E 002 | 6.36596736596735E 000 |

| DataSetID | ROW 1 | X1 | ACTUAL VALUE | CALC VALUE | RESIDUAL |
|---|---|---|---|---|---|
| 62 | 6 | 7.0000000000000E 000 | 1.4100000000000E 002 | 1.3703263403263E 002 | 3.9673659673659E 000 |
| 62 | 7 | 8.0000000000000E 000 | 1.3400000000000E 002 | 1.3543123543123E 002 | -1.4312354312354E 000 |
| 62 | 8 | 9.0000000000000E 000 | 1.3000000000000E 002 | 1.3382983682983E 002 | -3.8298368298368E 000 |
| 62 | 9 | 1.0000000000000E 001 | 1.3100000000000E 002 | 1.3222843822843E 002 | -1.2284382284382E 000 |
| 62 | 10 | 1.1000000000000E 001 | 1.2800000000000E 002 | 1.3062703962703E 002 | -2.6270396270396E 000 |
| 62 | 11 | 1.2000000000000E 001 | 1.2500000000000E 002 | 1.2902564102564E 002 | -4.0256410256410E 000 |
| 63 | 0 | 1.0000000000000E 000 | 1.2600000000000E 002 | 1.2837179487179E 002 | -2.3717948717948E 000 |
| 63 | 1 | 2.0000000000000E 000 | 1.3300000000000E 002 | 1.3301165501165E 002 | -1.1655011655011E -003 |
| 63 | 2 | 3.0000000000000E 000 | 1.3800000000000E 002 | 1.3763053613053E 002 | 3.6946386946386E -001 |
| 63 | 3 | 4.0000000000000E 000 | 1.4100000000000E 002 | 1.4225939675939E 002 | -1.2593967593967E 000 |
| 63 | 4 | 5.0000000000000E 000 | 1.4300000000000E 002 | 1.4688927738927E 002 | -3.8892773892773E 000 |
| 63 | 5 | 6.0000000000000E 000 | 1.5100000000000E 002 | 1.5151864801864E 002 | -5.1864801864801E -001 |
| 63 | 6 | 7.0000000000000E 000 | 1.6100000000000E 002 | 1.6114801864801E 002 | 4.8519813519813E 000 |
| 63 | 7 | 8.0000000000000E 000 | 1.6700000000000E 002 | 1.6077738927738E 002 | 6.2226107226107E 000 |
| 63 | 8 | 9.0000000000000E 000 | 1.7000000000000E 002 | 1.6540675990675E 002 | 4.5932400932401E 000 |
| 63 | 9 | 1.0000000000000E 001 | 1.7100000000000E 002 | 1.7003613053613E 002 | 9.6638694638694E -001 |
| 63 | 10 | 1.1000000000000E 001 | 1.7300000000000E 002 | 1.7466550116550E 002 | -1.6655011655011E 000 |
| 63 | 11 | 1.2000000000000E 001 | 1.7200000000000E 002 | 1.7929487179487E 002 | -7.2948717948717E 000 |
| 64 | 0 | 1.0000000000000E 000 | 1.7400000000000E 002 | 1.8507692307692E 002 | -1.1076923076923E 001 |
| 64 | 1 | 2.0000000000000E 000 | 1.7500000000000E 002 | 1.8065384615384E 002 | -5.6538461538461E 000 |
| 64 | 2 | 3.0000000000000E 000 | 1.7100000000000E 002 | 1.7623076923076E 002 | -5.2307692307692E 000 |
| 64 | 3 | 4.0000000000000E 000 | 1.7200000000000E 002 | 1.7180769230769E 002 | 1.9230769230769E -001 |
| 64 | 4 | 5.0000000000000E 000 | 1.7400000000000E 002 | 1.6738461538461E 002 | 6.6153846153846E 000 |
| 64 | 5 | 6.0000000000000E 000 | 1.7500000000000E 002 | 1.6296153846153E 002 | 1.2038461538461E 001 |
| 64 | 6 | 7.0000000000000E 000 | 1.7000000000000E 002 | 1.5853846153846E 002 | 1.1461538461538E 001 |
| 64 | 7 | 8.0000000000000E 000 | 1.6600000000000E 002 | 1.5411538461538E 002 | 1.1884615384615E 001 |
| 64 | 8 | 9.0000000000000E 000 | 1.5500000000000E 002 | 1.4969230769230E 002 | 5.3076923076923E 000 |
| 64 | 9 | 1.0000000000000E 001 | 1.4200000000000E 002 | 1.4526923076923E 002 | -3.2692307692307E 000 |
| 64 | 10 | 1.1000000000000E 001 | 1.3200000000000E 002 | 1.4084615384615E 002 | -8.8461538461538E 000 |
| 64 | 11 | 1.2000000000000E 001 | 1.2300000000000E 002 | 1.3642307692307E 002 | -1.3423076923076E 001 |

FIG. 11A

| LineNo | ReceiverNo | TimeValue | Magnitude |
|---|---|---|---|
| 60 | 1 | 1/6/2014 08:01:00.000000+00:00 | 8.700000000000000E-001 |
| 60 | 2 | 1/6/2014 08:01:00.000000+00:00 | 8.300000000000000E-001 |
| 60 | 3 | 1/6/2014 08:01:00.000000+00:00 | 8.800000000000000E-001 |
| 61 | 1 | 1/6/2014 08:01:00.000000+00:00 | 1.030000000000000E-002 |
| 61 | 2 | 1/6/2014 08:01:00.000000+00:00 | 1.470000000000000E-002 |
| 61 | 3 | 1/6/2014 08:01:00.000000+00:00 | 1.460000000000000E-002 |
| 62 | 1 | 1/6/2014 08:01:00.000000+00:00 | 1.320000000000000E-002 |
| 62 | 2 | 1/6/2014 08:01:00.000000+00:00 | 1.490000000000000E-002 |
| 62 | 3 | 1/6/2014 08:01:00.000000+00:00 | 1.300000000000000E-002 |
| 63 | 1 | 1/6/2014 08:01:00.000000+00:00 | 1.260000000000000E-002 |
| 63 | 2 | 1/6/2014 08:01:00.000000+00:00 | 1.430000000000000E-002 |
| 63 | 3 | 1/6/2014 08:01:00.000000+00:00 | 1.700000000000000E-002 |
| 64 | 1 | 1/6/2014 08:01:00.000000+00:00 | 1.740000000000000E-002 |
| 64 | 2 | 1/6/2014 08:01:00.000000+00:00 | 1.740000000000000E-002 |
| 64 | 3 | 1/6/2014 08:01:00.000000+00:00 | 1.550000000000000E-002 |
| 60 | 1 | 1/6/2014 08:02:00.000000+00:00 | 8.300000000000000E-001 |
| 60 | 2 | 1/6/2014 08:02:00.000000+00:00 | 8.600000000000000E-001 |
| 60 | 3 | 1/6/2014 08:02:00.000000+00:00 | 8.900000000000000E-001 |
| 61 | 1 | 1/6/2014 08:02:00.000000+00:00 | 1.130000000000000E-002 |
| 61 | 2 | 1/6/2014 08:02:00.000000+00:00 | 1.520000000000000E-002 |
| 61 | 3 | 1/6/2014 08:02:00.000000+00:00 | 1.480000000000000E-002 |
| 62 | 1 | 1/6/2014 08:02:00.000000+00:00 | 1.400000000000000E-002 |
| 62 | 2 | 1/6/2014 08:02:00.000000+00:00 | 1.450000000000000E-002 |
| 62 | 3 | 1/6/2014 08:02:00.000000+00:00 | 1.310000000000000E-002 |
| 63 | 1 | 1/6/2014 08:02:00.000000+00:00 | 1.330000000000000E-002 |
| 63 | 2 | 1/6/2014 08:02:00.000000+00:00 | 1.510000000000000E-002 |
| 63 | 3 | 1/6/2014 08:02:00.000000+00:00 | 1.710000000000000E-002 |
| 64 | 1 | 1/6/2014 08:02:00.000000+00:00 | 1.750000000000000E-002 |
| 64 | 2 | 1/6/2014 08:02:00.000000+00:00 | 1.750000000000000E-002 |
| 64 | 3 | 1/6/2014 08:02:00.000000+00:00 | 1.420000000000000E-002 |

| LineNo | ReceiverNo | | TimeValue | Magnitude |
|---|---|---|---|---|
| 60 | 1 | 1/6/2014 | 08:03:00.000000+00:00 | 8.500000000000000E 001 |
| 60 | 2 | 1/6/2014 | 08:03:00.000000+00:00 | 8.400000000000000E 001 |
| 60 | 3 | 1/6/2014 | 08:03:00.000000+00:00 | 9.200000000000000E 001 |
| 61 | 1 | 1/6/2014 | 08:03:00.000000+00:00 | 1.250000000000000E 002 |
| 61 | 2 | 1/6/2014 | 08:03:00.000000+00:00 | 1.500000000000000E 002 |
| 61 | 3 | 1/6/2014 | 08:03:00.000000+00:00 | 1.440000000000000E 002 |
| 62 | 1 | 1/6/2014 | 08:03:00.000000+00:00 | 1.480000000000000E 002 |
| 62 | 2 | 1/6/2014 | 08:03:00.000000+00:00 | 1.410000000000000E 002 |
| 62 | 3 | 1/6/2014 | 08:03:00.000000+00:00 | 1.280000000000000E 002 |
| 63 | 1 | 1/6/2014 | 08:03:00.000000+00:00 | 1.380000000000000E 002 |
| 63 | 2 | 1/6/2014 | 08:03:00.000000+00:00 | 1.610000000000000E 002 |
| 63 | 3 | 1/6/2014 | 08:03:00.000000+00:00 | 1.730000000000000E 002 |
| 64 | 1 | 1/6/2014 | 08:03:00.000000+00:00 | 1.710000000000000E 002 |
| 64 | 2 | 1/6/2014 | 08:03:00.000000+00:00 | 1.700000000000000E 002 |
| 64 | 3 | 1/6/2014 | 08:03:00.000000+00:00 | 1.320000000000000E 002 |
| 60 | 1 | 1/6/2014 | 08:04:00.000000+00:00 | 8.600000000000000E 001 |
| 60 | 2 | 1/6/2014 | 08:04:00.000000+00:00 | 8.600000000000000E 001 |
| 60 | 3 | 1/6/2014 | 08:04:00.000000+00:00 | 9.900000000000000E 001 |
| 61 | 1 | 1/6/2014 | 08:04:00.000000+00:00 | 1.370000000000000E 002 |
| 61 | 2 | 1/6/2014 | 08:04:00.000000+00:00 | 1.480000000000000E 002 |
| 61 | 3 | 1/6/2014 | 08:04:00.000000+00:00 | 1.330000000000000E 002 |
| 62 | 1 | 1/6/2014 | 08:04:00.000000+00:00 | 1.510000000000000E 002 |
| 62 | 2 | 1/6/2014 | 08:04:00.000000+00:00 | 1.340000000000000E 002 |
| 62 | 3 | 1/6/2014 | 08:04:00.000000+00:00 | 1.250000000000000E 002 |
| 63 | 1 | 1/6/2014 | 08:04:00.000000+00:00 | 1.410000000000000E 002 |
| 63 | 2 | 1/6/2014 | 08:04:00.000000+00:00 | 1.670000000000000E 002 |
| 63 | 3 | 1/6/2014 | 08:04:00.000000+00:00 | 1.720000000000000E 002 |
| 64 | 1 | 1/6/2014 | 08:04:00.000000+00:00 | 1.720000000000000E 002 |
| 64 | 2 | 1/6/2014 | 08:04:00.000000+00:00 | 1.660000000000000E 002 |
| 64 | 3 | 1/6/2014 | 08:04:00.000000+00:00 | 1.230000000000000E 002 |

| LineNo | TimeValue | ReceiverNo | Magnitude |
|---|---|---|---|
| 60 | 1/6/2014 08:01:00.000000+00:00 | 1 | 8.7000000000000E 001 |
| 60 | 1/6/2014 08:02:00.000000+00:00 | 1 | 8.3000000000000E 001 |
| 60 | 1/6/2014 08:03:00.000000+00:00 | 1 | 8.5000000000000E 001 |
| ... | ... | ... | ... |
| 60 | 1/6/2014 08:04:00.000000+00:00 | 3 | 9.9000000000000E 001 |
| 61 | 1/6/2014 08:01:00.000000+00:00 | 1 | 1.0300000000000E 002 |
| ... | ... | ... | ... |
| 61 | 1/6/2014 08:04:00.000000+00:00 | 3 | 1.3300000000000E 002 |
| 62 | 1/6/2014 08:01:00.000000+00:00 | 1 | 1.3200000000000E 002 |
| ... | ... | ... | ... |
| 62 | 1/6/2014 08:04:00.000000+00:00 | 3 | 1.2500000000000E 002 |
| 63 | 1/6/2014 08:01:00.000000+00:00 | 1 | 1.2600000000000E 002 |
| ... | ... | ... | ... |
| 63 | 1/6/2014 08:04:00.000000+00:00 | 3 | 1.7200000000000E 002 |
| 64 | 1/6/2014 08:01:00.000000+00:00 | 1 | 1.7400000000000E 002 |

| ReceiverNo | ROW_I | COLUMN_I | AMPLITUDE_Magnitude | PHASE_Magnitude |
|---|---|---|---|---|
| 60 | -2 | -1 | 9.84885780179610E 000 | 2.66954118285664E-001 |
| 60 | -2 | 0 | 1.00000000000000E 001 | 3.14159265358979E 000 |
| 60 | -2 | 1 | 9.84885780179610E 000 | -2.666954118285664 |
| 60 | -1 | -1 | 6.20080789130044E 000 | 2.30624683895475E-001 |
| 60 | -1 | 0 | 1.33416640641263E 001 | -1.79759517484878E 001 |
| 60 | -1 | 1 | 1.31738370073106E 000 | -4.54143956648142E-001 |
| 60 | 0 | -1 | 2.80535202782111E 001 | -2.03261486605314E 000 |
| 60 | 0 | 0 | 1.04800000000000E 003 | 0.00000000000000E 000 |
| 60 | 0 | 1 | 2.80535202782111E 001 | 2.03261486605314E 000 |
| 60 | 1 | -1 | 1.31738370073106E 001 | 4.54143956648143E-002 |
| 60 | 1 | 0 | 1.33416640641263E 001 | 1.79759517484878E 000 |
| 60 | 1 | 1 | 6.20080789130044E 000 | -2.30624683895475E 000 |
| 60 | 2 | -1 | 9.84885780179610E 000 | 2.66954118285664E-001 |
| 60 | 2 | 0 | 1.00000000000000E 001 | 3.14159265358979E 000 |
| 60 | 2 | 1 | 9.84885780179610E 000 | -2.66954118285664E-001 |
| 61 | -2 | -1 | 2.70739727413618E 001 | -2.74763214112317E 000 |
| 61 | -2 | 0 | 1.60000000000000E 001 | 3.14159265358979E 000 |
| 61 | -2 | 1 | 2.70739727413618E 001 | 2.74763214112317E 000 |
| 61 | -1 | -1 | 3.96798247762984E 001 | -1.87733282371117E 000 |
| 61 | -1 | 0 | 2.35372045918796E 001 | -2.92753197002597E 000 |
| 61 | -1 | 1 | 4.25853437901146E 001 | -2.38702400673879E 000 |
| 61 | 0 | -1 | 1.08365123540741E 002 | 2.93228253722943E |
| 61 | 0 | 0 | 1.64600000000000E 003 | 0.00000000000000E 000 |
| 61 | 0 | 1 | 1.08365123540741E 002 | -2.93228253722943E 000 |
| 61 | 1 | -1 | 4.25853437901146E 001 | 2.38702400673879E 000 |
| 61 | 1 | 0 | 2.35372045918796E 001 | 2.92753197002597E 000 |
| 61 | 1 | 1 | 3.96798247762984E 001 | 1.87733282371117E 000 |
| 61 | 2 | -1 | 2.70739727413618E 001 | -2.74763214112317E 000 |
| 61 | 2 | 0 | 1.60000000000000E 001 | 3.14159265358979E 000 |
| 61 | 2 | 1 | 2.70739727413618E 001 | 2.74763214112317E 000 |
| 62 | -2 | -1 | 1.91572440606680E 001 | 2.72258360863342E 000 |
| 62 | -2 | 0 | 2.00000000000000E 000 | 0.00000000000000E 000 |
| 62 | -2 | 1 | 1.91572440606680E 001 | -2.72258360863342E 000 |
| 62 | -1 | -1 | 2.90897815445419E 001 | -2.62753579728362E 000 |
| 62 | -1 | 0 | 8.48528137423857E 000 | 2.35619449019235E 000 |
| 62 | -1 | 1 | 2.97957146195695E 001 | -2.16454516163781E 000 |

| ReceiverNo | ROW_I | COLUMN_I | AMPLITUDE_Magnitude | PHASE_Magnitude |
|---|---|---|---|---|
| 62 | 0 | -1 | 5.60267793113258E 001 | 1.01627792954930E 000 |
| 62 | 0 | 0 | 1.65400000000000E 003 | 0.00000000000000E 000 |
| 62 | 0 | 1 | 5.60267793113258E 001 | -1.01627792954930E 000 |
| 62 | 1 | -1 | 2.97957146195695E 001 | 2.16454516163781E 000 |
| 62 | 1 | 0 | 8.48528137423857E 000 | -2.35619449019234E 000 |
| 62 | 1 | 1 | 2.90897815445419E 001 | 2.62753579728362E 000 |
| 62 | 2 | -1 | 1.91572440606680E 001 | 2.72258360863342E 000 |
| 62 | 2 | 0 | 2.00000000000000E 000 | 0.00000000000000E 000 |
| 62 | 2 | 1 | 1.91572440606680E 001 | -2.72258360863342E 000 |
| 63 | -2 | -1 | 1.24899959967968E 001 | -1.81336020089038E 000 |
| 63 | -2 | 0 | 2.40000000000000E 001 | 3.14159265358979E 000 |
| 63 | -2 | 1 | 1.24899959967968E 001 | 1.81336020089038E 000 |
| 63 | -1 | -1 | 1.69716963139497E 001 | -8.27074110421063E-001 |
| 63 | -1 | 0 | 4.14004830889689E 001 | -2.49326066450253E 000 |
| 63 | -1 | 1 | 1.97980181893811E 001 | 2.39191812656137E 000 |
| 63 | 0 | -1 | 1.28561269439906E 002 | -2.69585645274575E 000 |
| 63 | 0 | 0 | 1.84600000000000E 003 | 0.00000000000000E 000 |
| 63 | 0 | 1 | 1.28561269439906E 002 | 2.69585645274575E 000 |
| 63 | 1 | -1 | 1.97980181893811E 001 | -2.39191812656137E 000 |
| 63 | 1 | 0 | 4.14004830889689E 001 | 2.49326066450253E 000 |
| 63 | 1 | 1 | 1.69716963139497E 001 | 8.27074110421063E-001 |
| 63 | 2 | -1 | 1.24899959967968E 001 | -1.81336020089038E 000 |
| 63 | 2 | 0 | 2.40000000000000E 001 | 3.14159265358979E 000 |
| 63 | 2 | 1 | 1.24899959967968E 001 | 1.81336020089038E 000 |
| 64 | -2 | -1 | 2.19317121994613E 001 | -2.29313766065506E 000 |
| 64 | -2 | 0 | 2.30000000000000E 001 | 0.00000000000000E 000 |
| 64 | -2 | 1 | 2.19317121994613E 001 | 2.29313766065506E 000 |
| 64 | -1 | -1 | 2.75160550222441E 001 | -1.63770706125046E 000 |
| 64 | -1 | 0 | 4.31393092202460E 001 | 8.01790137705454E-001 |
| 64 | -1 | 1 | 1.99215138986182E 001 | 2.86425230380573E 000 |
| 64 | 0 | -1 | 1.36634549071602E 002 | 1.00281515644305E 000 |
| 64 | 0 | 0 | 1.92900000000000E 003 | 0.00000000000000E 000 |
| 64 | 0 | 1 | 1.36634549071602E 002 | -1.00281515644305E 000 |
| 64 | 1 | -1 | 1.99215138986182E 001 | -2.86425230380573E 000 |
| 64 | 1 | 0 | 4.31393092202460E 001 | -8.01790137705454E-001 |
| 64 | 1 | 1 | 2.75160550222441E 001 | 1.63770706125046E 000 |
| 64 | 2 | -1 | 2.19317121994613E 001 | -2.29313766065506E 000 |
| 64 | 2 | 0 | 2.30000000000000E 001 | 0.00000000000000E 000 |
| 64 | 2 | 1 | 2.19317121994613E 001 | 2.29313766065506E 000 |

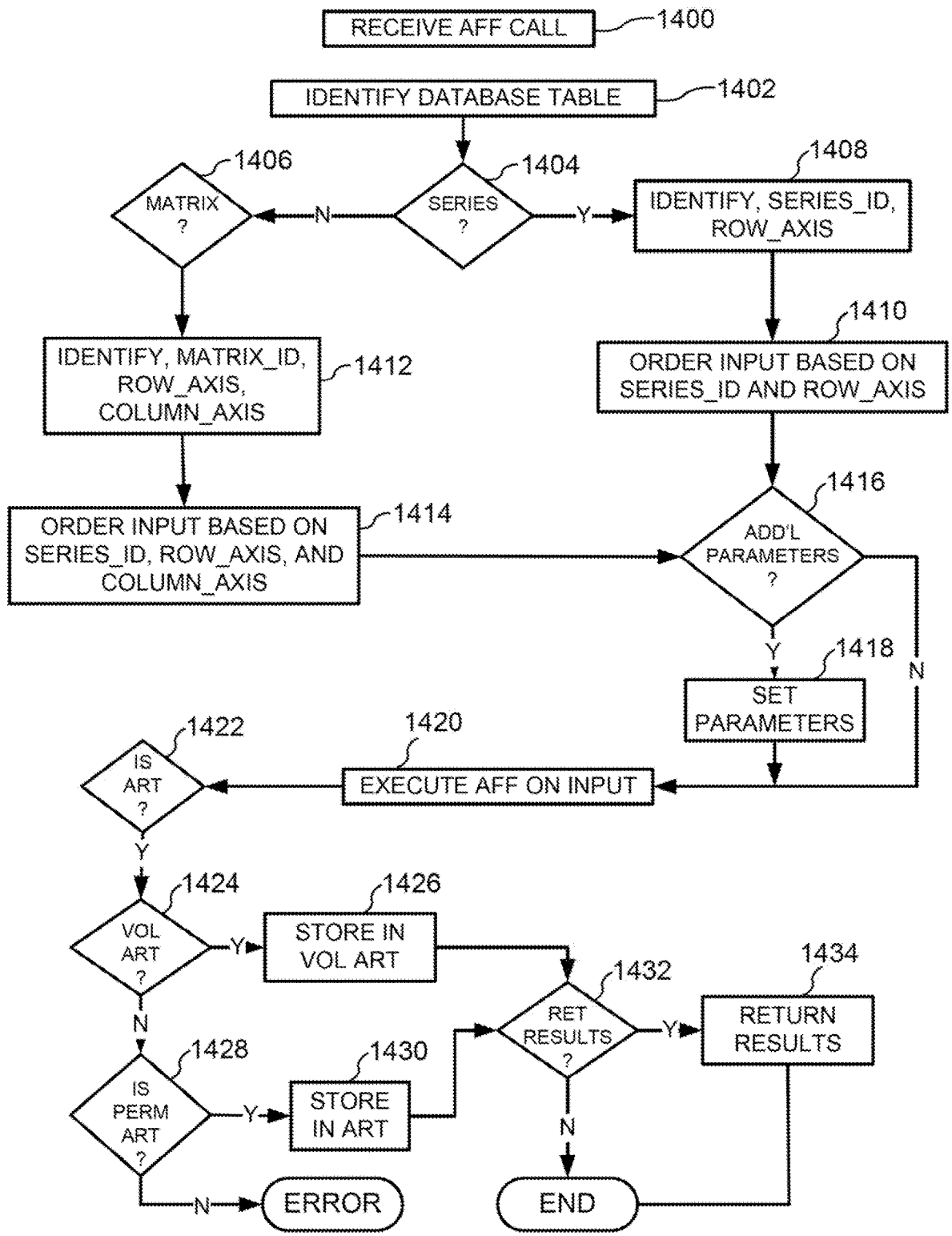

UNBOUNDED ANALYTIC FRAMEWORK IN A DATA STORE SYSTEM

CLAIM OF PRIORITY

This application claims the benefit of priority under 35 U.S.C. § 119(e) of U.S. Provisional Patent Application Ser. No. 62/955,902 filed on Dec. 31, 2019, which is hereby incorporated by reference herein in its entirety.

BACKGROUND

The need for new applications in the Internet-of-Things (IOT) application space are driving the need for fast, reliable, scalable Time Series database solutions. Once the IoT data is stored within the system, there is a desire by data scientists to analyze the data by running various statistical and other forms of scientific functions against the data. Many of these functions take 1D arrays (spatial series and time series) and 2D arrays (matrices) as inputs and respectively produce 1D array and 2D array result sets. The status quo approach to supporting new data types such as 1D and 2D arrays would be to create in-database types that hold all the data associated with that type, but this can lead to large amount of data being stored in a single location, as well as lead to inefficient non-parallel algorithms when it comes to executing a function against that data instance. The other problem is that the amount of data held within a 1D and 2D array tend to be "unbounded". For example, data may be collected in some scenarios from sensors on a 24/7 basis. The "size" of the array can be considered to be "infinite" (a.k.a. "unbounded").

It is desirable to solve these issues using "logical data types", which may provide an abstraction that separates how a data scientist views the data (in the form of 1D and 2D arrays) versus how that data is actually stored within a database itself. Such implementation may also address the issue of dealing with arrays which are "unbounded", in that the size of the supported arrays is only limited by the ability of a database to accommodate storage. Solving the unbounded array problem is an extremely important characteristic, given the massive amount of data being collected by the sensor driven IoT revolution.

SUMMARY

According to one aspect of the disclosure, a data store system may include a storage device configured to store a plurality of data store tables. The data store may further include a plurality of processing units. At least one processing unit from the plurality of processing units may receive an analytic function call. The at least one processing unit may further identify, in the analytic function call, at least one column of a data store table on which to execute an analytic function in the analytic function call. The at least one processing unit may further identify, in the analytic function call, an identifier column of the data store table. Each row of the at least one column may be associated with a common row value of the identifier column. The at least one processing unit may further identify, in the analytic function call, at least one index column of the data store table. Each value in each at the least one index column may identify an index value on which to index each value of the at least one column with respect to each value of the identifier column. The at least one processing unit may further order values of the at least one column in accordance with the identifier column and the at least one index column. The at least one processing unit may further execute the analytic function on the ordered values to generate a result set. The at least one processing unit may further order the result set in accordance with the identifier column and the at least one index column.

According to another aspect of the disclosure, a method may include receiving, with at least one processing unit from a plurality of processing units, an analytic function call. The method may further include identifying, with the at least one processing unit, in the analytic function call, at least one column of a data store table on which to execute an analytic function in the analytic function call. The method may further include identifying, with at least one processing unit, in the analytic function call, an identifier column of the data store table. Each row of the at least one column may be associated with a common row value of the identifier column. The method may further include identifying, with at least one processing unit, in the analytic function call, at least one index column of the data store table. Each value in each at the least one index column may identify an index value on which to index each value of the at least one column with respect to each value of the identifier column. The method may further include ordering, with at least one processing unit, values of the at least one column in accordance with the identifier column and the at least one index column. The method may further include executing, with at least one processing unit, the analytic function on the ordered values to generate a result set. The method may further include ordering, with at least one processing unit, the result set in accordance with the identifier column and the at least one index column.

According to another aspect of the disclosure, a computer-readable medium may be encoded with a plurality of instructions executable by a processor. The plurality of instructions may include instructions to receive an analytic function call. The plurality of instructions may further include instructions to identify, in the analytic function call, at least one column of a data store table on which to execute an analytic function in the analytic function call. The plurality of instructions may further include instructions to identify, in the analytic function call, an identifier column of the data store table. Each row of the at least one column may be associated with a common row value of the identifier column. The plurality of instructions may further include instructions to identify, in the analytic function call, at least one index column of the data store table. Each value in each at the least one index column may identify an index value on which to index each value of the at least one column with respect to each value of the identifier column. The plurality of instructions may further include instructions to order values of the at least one column in accordance with the identifier column and the at least one index column. The plurality of instructions may further include instructions to execute the analytic function on the ordered values to generate a result set. The plurality of instructions may further include instructions to order the result set in accordance with the identifier column and the at least one index column.

BRIEF DESCRIPTION OF THE DRAWINGS

The present disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is a block diagram of example execution of an analytic framework function.

FIGS. 5A-B are an example table of sensor measurements.

FIG. 6 is an example of an ordered input set indexed using a one-dimensional index.

FIG. 7 is another example of an ordered input set indexed using a one-dimensional index.

FIG. 8 is an example of an ordered input set indexed using a two-dimensional index.

FIG. 8 is an example of a results set from a primary results set of an analytic function.

FIG. 9 is an example of a results set from a secondary results set of an analytic function, FIGS. 10A-B are an example of a results set from a tertiary results set of an analytic function, FIGS. 11A-B are an example table of seismic sensor measurements.

FIG. 12 is an example of an ordered input set indexed using a two-dimensional index.

FIGS. 13A-B are a results set of an analytic function.

FIG. 14 is an operational flow diagram of example operation of a data store system during execution of an analytic function using an analytic function using unbounded input arrays.

DETAILED DESCRIPTION OF THE FIGURES

Figure 1:
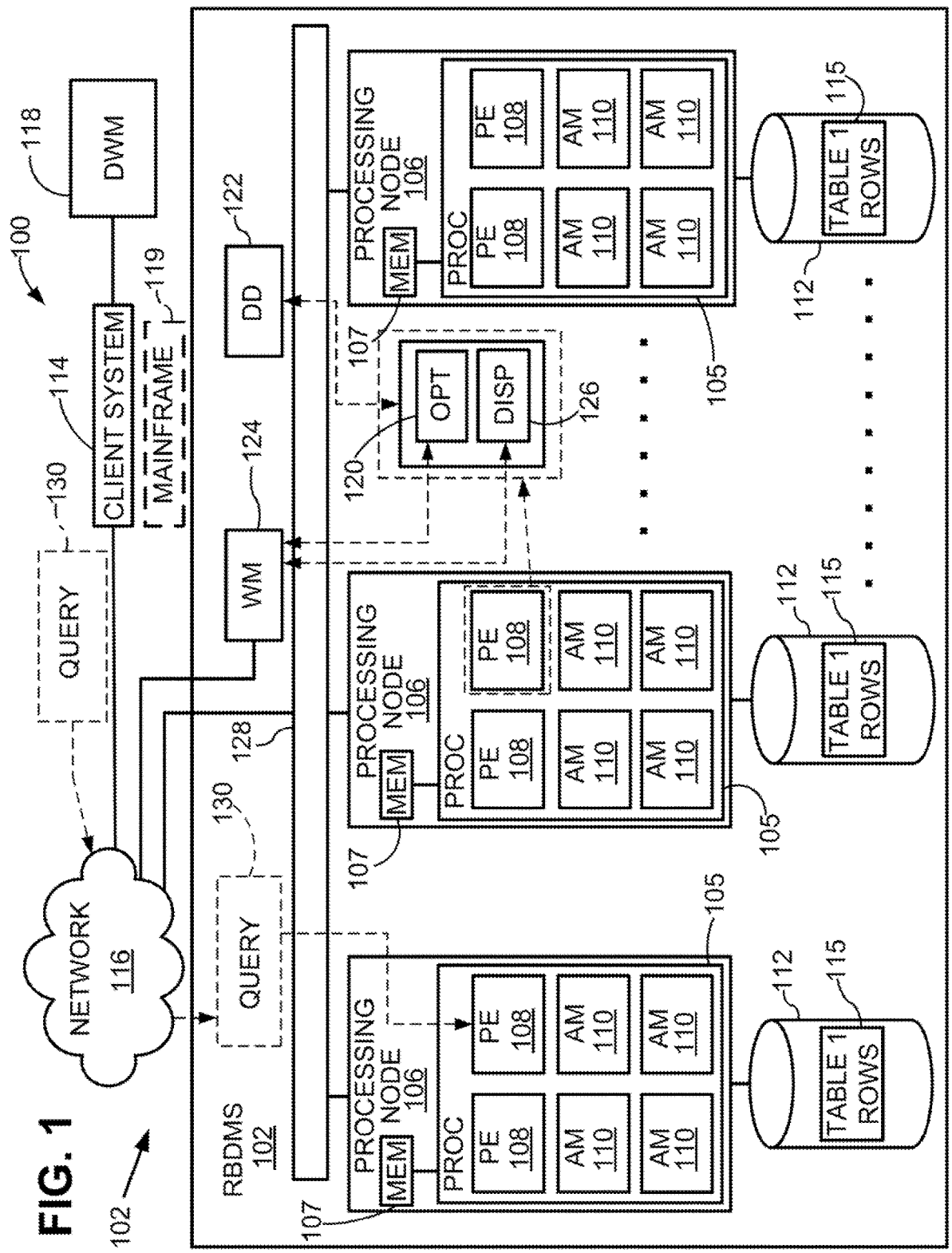
FIG. 1 is a block diagram of an example database system.

FIG. 1 is a diagrammatic representation of example architecture for an analytic platform 100, such as a Teradata Vantage. In one example, the analytic platform 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having a number of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 112. The processing units may include processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, random access memory (RAM), removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit types such as parsing engine (PE) modules 108 and access modules (AM) 110. As described herein, each module, such as the parsing engine modules 108 and access modules 110, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each module may include memory hardware, such as a portion of the memory 107, for example, that comprises instructions executable with the processor 105 or other processor to implement one or more of the features of the module. When any one of the modules includes the portion of the memory that comprises instructions executable with the processor, the module may or may not include the processor. In some examples, each module may just be the portion of the memory 107 or other physical memory that comprises instructions executable with the processor 105 or other processor to implement the features of the corresponding module without the module including any other hardware. Because each module includes at least some hardware even when the included hardware comprises software, each module may be interchangeably referred to as a hardware module, such as the parsing engine hardware module or the access hardware module. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RDBMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RDBMS 102.

Each parsing engine module 108, upon receiving an incoming database query, such as the query 130, may apply an optimizer module 120 to assess the best plan for execution of the query.

An example of an optimizer module 120 is shown in FIG. 1 with regard to a parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RDBMS 102 as well as fields of each database, for example. Further, the data dictionary module 122 may specify the type, length, and/or other various characteristics of the stored tables. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MX), for example, may be implemented in the database system 100 separately or in conjunction with SQL. The data dictionary may be stored in the DSFs 112 or some other storage device and selectively accessed.

The RDBMS 102 may include a workload management system workload management (WM) module 124. The WM module 124 may be implemented as a "closed-loop" system management (CLSM) architecture capable of satisfying a set of workload-specific goals. In other words, the RDBMS 102 is a goal-oriented workload management system capable of supporting complex workloads and capable of self-adjusting to various types of workloads. The WM module 124 may communicate with each optimizer module 120, as shown in FIG. 1, and is adapted to convey a confidence threshold parameter and associated parameters to the optimizer module 120 in communication. Further, the WM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. Further, the DWM client 118 may communicate with the WM module 124 via the network 116.

The WM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the WM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processing nodes 106 or may be stored and executed on separate memories and processors that are in communication with the processing nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
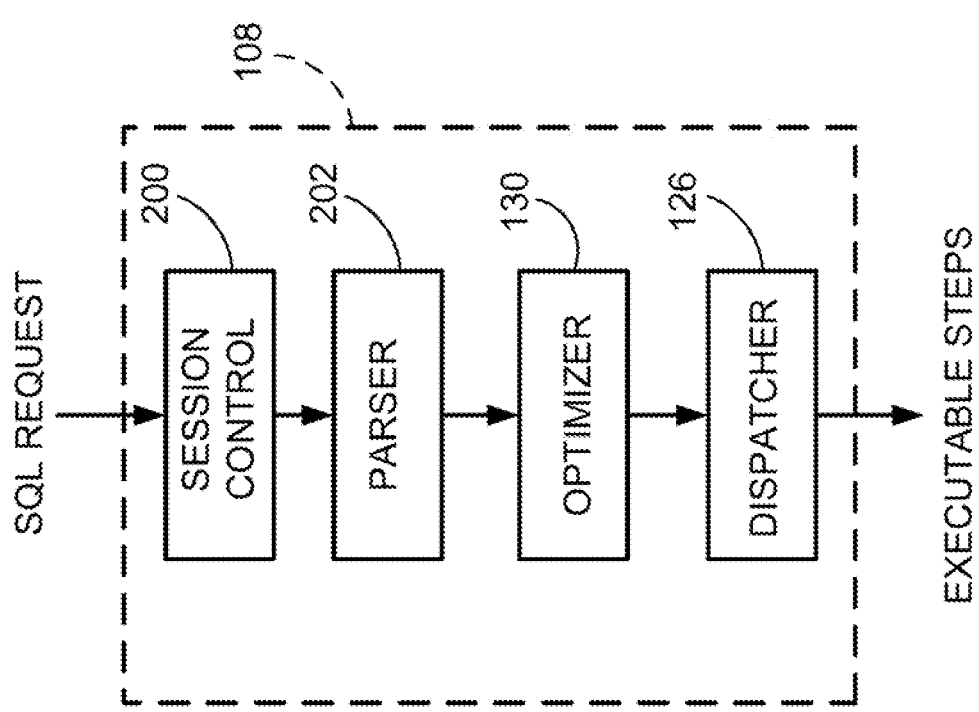
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
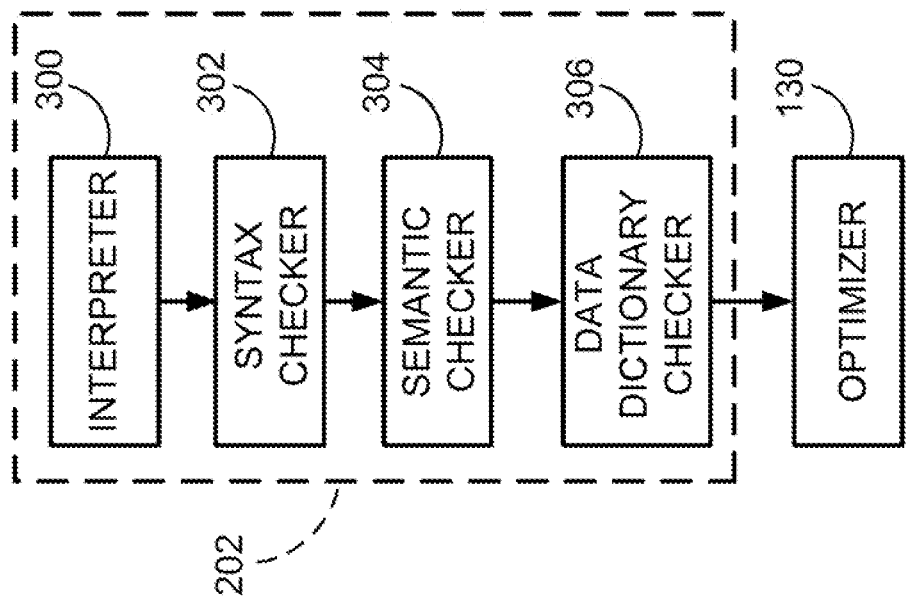
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform 1I the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the WM module 124 monitoring takes place by communicating with the dispatcher module 126 as it checks the query execution step responses from the access modules 110. The step responses include the actual cost information, which the dispatcher module 126 may then communicate to the WM module 124 which, in turn, compares the actual cost information with the estimated costs of the optimizer module 120.

In one example, the RDBMS 102 may be used to process a variety of analytic functions on amounts of data not available to traditional systems offering scientific analytic functionality. Through use of the RDBMS 102 which has the capability to manage enormous amounts of data, the analytic functions may be applied to multiple sets of data with a single function call. In order to manage the multiple sets, the RDBMS 102 may be configured to handle both multiple 1-D data arrays (series) and multiple 2-D data arrays (matrices). Such ability allows the RDBMS 102 to offer traditional analytic functions, such as those valued by data scientists, on a much larger scale than has been previously available.

Each series in the database can be thought of as a one-dimensional array with an explicitly exposed index. The index can be either based on time—TIMESTAMP, TIMESTAMP WITH TIMEZONE, or DATE—or based on some numerical sequencing—INTEGER or FLOAT. The AF functions supported by this feature work temporal or spatial series—the only requirement imposed on the series by the functions is that they must be discrete, meaning that they be sampled or indexed at equally spaced points (in time or space) and that there are no missing values. The term "logical" is used to infer that an instance of the series in the database is not backed up by a data type—meaning the data associated with that instance is not stored within an actual data type. Rather, being a database "instance" means that the series is stored within a single database table, but the table is distributed within the database in any supported manner.

A matrix in the database can be thought of as a two-dimensional array with both its row-index and column-index explicitly exposed and a series in each of its column positions. Thus, a matrix can also be described as an organized collection of individual series. Once again, each of the indexes can be independently based on time or some numerical sequencing with both indexes required to be discrete. The term "logical" infers that an instance of the matrix in the database is not backed up by a data type—meaning the data associated with that instance is not stored within an actual data type. Rather, being a database "instance" means that the matrix is stored within a single database table, but the table may be distributed within the database in any supported manner.

FIG. 4 is a block diagram of the RDBMS 102 managing an analytic framework (AF) function call. In one example, an AF function call 400 may be passed from a GUI 402 to the RDBMS 102. The AF function (AFF) 400 call may contain array information recognized by the RDBMS 102 to organize both input data and resultant data into ordered sets in accordance with that specified in the AF function call. Such recognition by the RDBMS 102 allows data from a database table to be organized according to the information contained in the AF function call 400. The AF function call 400 may contain ordered set information 404 related to series or matrices data arrays allowing the RDBMS 102 to extract data from a table 406 (table "T1") and return the results set 408 of the analytic function as ordered sets. The ordered set information 404 may allow the input and output of the AF function 410 to be organized into "wavelets" 412. Each wavelet 410 may represent a grouping of data that allows traditional analytics to be applied on a much larger scale. Each wavelet 408 may identify a specific grouping of input and results allowing additional analytics or plotting to be applied over the entire results set 406. While the results set 406 is shown being sent to the GUI 402, in other examples, the results set may be stored and/or reused for subsequent functions as will be further described.

Figure 5B:
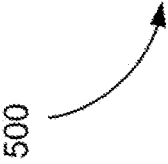

FIGS. 5A-B are an example of a table 500 used to collect information regarding sensor measurements from an array of five sensors. In this example, each sensor may generate a measurement at twelve different times for a total of sixty sensor measurements stored in the table 500. The table 500 may be created through the syntax CREATE TABLE SeriesDataSets (DataSetID integer, SeqNo integer, TimeValue TIMESTAMP(6) WITH TIME ZONE, Magnitude float). Each DataSetTID column value may indicate a particular sensor identification number (1 through 5). Each SeqNo column value may identify a particular round of sensor readings (1 through 12). Each TimeValue column values may indicate the timepoint when the sensor measurement was taken. Lastly, each Magnitude column values may indicate the magnitude of a particular sensor measurement. As shown in FIGS. SA and SB, the table 500 collects the data each time a round of sensor readings is generated to produce the data collected in the manner shown in FIGS. 5A and 5B.

In one example, the AF may allow series data to be ordered by a numerical index or a time-based index prior to an AF function being executed on the data. For example, the portion of the syntax of an AF function call that indicates that results are to be ordered via series data may be:
SERIES_SPEC(TABLE_NAME(SeriesDataSets), ROW AXIS(SEQUENCE(SeqNo)), SERIES_ID(DataSetID), PAYLOAD(FIELDS(Magnitude), CONTENT (REAL))
The SERIES_SPEC syntax allows the RDBMS 102 to recognize and use a series is stored in the database. The TABLE_NAME syntax allows the referenced table to be identified, which is table 500, SeriesDataSets. The ROW_AXIS syntax allows a column in the referenced table to be identified as the column by which the AF series may index each AF function individual result, which in this case is column SeqNo, which identifies each round of sensor readings. The ROW_AXIS syntax may allow the use of "SEQUENCE" to denote the index is equally spaced integers or float values, which is an integer for column SeqNo. The SERIES_ID syntax allows one or more columns in the referenced table DataSetID to be identified as the wavelet index used to identify a group of AF function input as well as the associated output. The PAYLOAD syntax provides the field for the AF function, which is the sensor readings from column Magnitude. The CONTENT syntax indicates the type of element held in the PAYLOAD field(s), which, in this example, is a real number in column Magnitude.

In one example, the RDBMS 102 may support both scalar data types (INTEGER, FLOAT, VARCHAR, etc.) and semi-structured data types (JSON, AVRO, CSV, etc.). Thus, when a series or array is stored in the database and function results in an ART table, the sample indexes and observation values associated with the sources, and the result indexes and result magnitudes associated with the results, may be present either as a scalar column in the database, or as a data member within a semi-structured object. Thus, the terms "field/fields" may be used in a generic sense to signify a reference to either a database column or a data member within a semi-structured data type accessible using a database-suitable dot-notation index.

FIG. 6 shows ordered data set 600 according to the SERIES_SPEC syntax. As indicated by the syntax, the ordered data set 600 is ordered by wavelets 602, with each wavelet 602 being identified by a value from the SeqNo column. Within each wavelet 602, data is indexed by DataSetID through the SeqNo column serving as input to the ROW_AXIS. Through this syntax, an analytic function may be executed on the input data in the ordered manner specified in the SERIES_SPEC syntax. As shown, use of the SERIES_ID portion of the SERIES_SPEC syntax allows the input values to be identified by wavelet 602, which in this example is each particular value in the DataSetID column. Each wavelet 602 contains an ordered set of rows indexed on the ROW_AXIS column SeqNo. The wavelet indexing allows each wavelet 602 to be separately identified allowing individual management and use by the RDBMS 102. The flexibility of the AF allows any available columns having appropriate characteristics to be used if available.

Similarly, the SERIES_SPEC syntax may use a time-based index regarding the ROW_AXIS feature. The TIMECODE index may allow the use of timestamp or date values if the increments between each column value are equal. FIG. 7 is an ordered set 700 for the example SERIES SPEC syntax using the TIMECODE features on table 500. As shown in FIG. 7, the ordered set 700 may use input in accordance with the syntax:
SERIES SPEC(TABLE_NAME(SeriesDataSets), ROW AXIS(TIMECODE(TimeValue), SERIES_ID(DataSetID), PAYLOAD(FIELDS(Magnitude), CONTENT (REAL))
In one example, the TimeValue column of table 500 may include a timestamp for each timepoint a sensor measurement is captured. Each wavelet 702 of the ordered set 700 is identified and indexed by the DataSetID column, with the results of each individual wavelet 702 indexed by values of the TimeValue column. As previously described, SPEC SERIES syntax also allows evenly spaced date values (e.g. day, month, year) to be used as well.

The AF allows various one or more types of input to be used in the PAYLOAD field. For example, the PAYLOAD input field may accept univariate real numbers, complex numbers, or multivariate real numbers. Similarly, the input fields for ROW AXIS and COLUMN_AXIS may accept univariate real numbers, complex numbers, or multivariate real numbers. The multivariate numbers may also include amplitude and phase numbers, both radians and degrees, for use in functions such a Fourier transforms, for example.

The AF may also allow a results set to be stored temporarily or persistently in the database as analytic results table (ART). The AF may allow the syntax of INTO ART or INTO VOLATILE ART to store a results set. This feature allows an association between the results of an AF function with a name label allowing easy retrieval of a results set for subsequent function processing or plotting. In use, an example syntax statement of INTO ART (OUTPUT_TABLE) used for the AF function would store the results set in the persistent table OUTPUT_TABLE. Use of the syntax INTO VOLATILE ART(OUTPUT_TABLE) would store results in the volatile table OUTPUT_TABLE.

An AF function may use the SERIES_SPEC or MATRIX_SPEC functionality to order the input and maintain the order in the output. In one example, a linear regression function may use the following AF function call syntax:
EXECUTE FUNCTION INTO VOLATILE ART (LINEAR_REGR_RESULTS) TD_LINEAR_REGR(SERIES_SPEC(TABLE_NAME(SeriesDataSets), SERIES_ID (DataSetID), ROW_AXIS(SEQUENCE(SeqNo)), PAYLOAD(FIELDS(Magnitude, SeqNo), CONTENT (MULTIVAR_REAL))), FUNC_PARAMS(FORMULA ('Y=b+m*X1'), WEIGHTS(0), COEFF_STATS(0), MODEL STATS(1), RESIDUALS(1), ALGORITHM ('QR')));
The function, TD_LINEAR_REGR may perform linear regression on the input, which uses the values of the Magnitude and SeqNo columns. The SERIES_SPEC syntax provides the input data set to be ordered in accordance with each wavelet identified by the values of the DataSetID column and each wavelet indexed by the values of the SeqNo column. The FUNC_PARAMS allows function parameters specific to a particular function to be set.

Once the function has been executed, the AF allows various results to be extracted as defined by the AF function. For example, the syntax SELECT * FROM LINEAR_REGR_RESULTS would return the primary layer results as shown in in FIG. 8. In results set 800, there are two rows for each SERIES_ID column, the DataSetID column. There are two rows for each linear regression coefficient, "b" and "in". Thus, the wavelets 802 allow a user to identify these coefficients for any number of input wavelets used to generate the coefficients. Alternatively, the following syntax may also return the primary results:
TD_EXTRACT_RESULTS(ART_SPEC(FABLE_NAME (LINEAR_REGR_RESULTS), LAYER(ARTPRIMARY)
The LAYER syntax may return the layer named as defined in the function.

Through the AF the ART table enables the feature of multi-layered result sets. In the statistical program environment, some analytic functions, such as a linear regression function, produce result sets with multiple layers of information, all stored within the same in-memory result object. In the case of the linear regression function, the respective result set has three layers: the primary result set which consists of the estimated coefficients for the regression: an optional auxiliary result set containing modeling metadata (statistical data about the regression model itself); and an optional auxiliary result set containing the residuals generated during the linear regression fitting process. The ART table provides this by transparently storing the different result data sets within a layered model. The primary result sets in the ART table are retrieved by issuing a SELECT operation against the ART table whereas the auxiliary result sets are retrieved using the AF utility function TD_EXTRACT_RESULTS.

In one example, a secondary layer of results from LINEAR_REGR_RESULTS may be returned through the syntax:
TD_EXTRACT_RESULTS(ART_SPEC(TABLE_NAME (LINEAR_REGR_RESULTS). LAYER(ARTIFMETADA)
The ART_SPEC syntax allows data to be accessed from multiple layers providing a more efficient extraction than that using SERIES_SPEC and MATRIX_SPEC. FIG. 9 is a results set 900 showing a secondary layer extracted from the LINEAR_REGR_RESULTS table. As shown, each wavelet 900 is based on a particular DataSetID column value.

The AF may allow as many layers to be extracted as are produced by the AF function. For example, tertiary results of the LINEAR_REGR_RESULTS. In one example, the AF may allow the following syntax to extract the tertiary results:
TD_EXTRACT_RESULT(ART_SPEC(TABLE_NAME (LINEAR_REGR_RESULTS), LAYER(ARTFITRESIDUALS)))

Figure 10B:

FIGS. 10A and 10B are a results set 1000 generated from this syntax. Each results set is identifiable by a wavelet 1002 indexed on the DataSetID. The TD_EXTRACT_RESULT syntax may be included as part of the AF function call.

The layered results example of FIGS. 8-10B highlight a valuable feature AF. As shown, three different results all carry a common identifier, which is based on DataSetID for this example. This identifier may be carried through any subsequent actions taken on a result set stored in an ART. This feature provides the ability to manage large volumes of data by allowing reference to the identifier. Thus, the AF takes advantage of both analytic function tools and the power of the MPP without the need for database-centric syntax.

The AF frameworks may also be extended to allow 2-D arrays to be used for ordering data sets allowing a results set to be organized accordingly. For example, a table 1100 shown in FIGS. 11A and 11B may be populated with data captured from seismic sensors. The data in table 1100 may represent data capture across four sensor lines each having three receivers spaced 10 meters apart from one another. The data of table 1100 is meant to show three time points in which each seismic sensor collected data. The table 1100 may be created through the syntax:
CREATE TABLE MatrixDataSets (LineNo integer, RecieverNo integer, TimeValue TIMESTAMP(6) WITH TIME ZONE, Magnitude float);
Each column LineNo field contains the value identifying each line. Each column ReceiverNo contains a value identifying a particular receiver number for each line. The TimeValue column contains a timestamp value for each sensor measurement. The last column Magnitude contains values representing the seismic sensor measurements.

The AF may allow data in the table to be ordered using a matrix relationship using wavelets to distinguish each data matrix in the ordered set. For example, an ordered set using a two-dimensional indexing array may be created through the syntax:
MATRIX_SPEC (TABLE_NAME(MatrixDataSets), MATRIX_ID(LineNo), ROW_AXIS(TIMECODE(TimeValue)), COLUMN_AXIS(SEQUENCE(ReceiverNo)), PAYLOAD(FIELDS(MAGNITUDE), CONTENT (REAL)))
The MATRIX_SPEC syntax is used to reference a matrix stored in the database within a table. Similar to the SERIES_SPEC syntax, the TABLE_NAME may reference a table from which the data is drawn and ROW_AXIS may indicate a column to serve as a first index on input and output data. The COLUMN_AXIS syntax allows another column of a table to be used as second index on the input and output of the respective AF function. MATRIX_ID indicates the column to serve as the wavelet identification.

For the example syntax statement used here, an ordered set 1200 may be generated, which is shown in FIG. 12. As show, each wavelet 1202 is indexed by LineNo column values. Within each wavelet 1202, each Magnitude column value is indexed by a timepoint value from the TimeValue column and a receiver number from the ReceiverNo column. Thus, for each wavelet 802, each Magnitude column value will have a unique combination of a timepoint and ReceiverNo column value, creating a 2-D array within each wavelet 1202.

Similar to the series data, the AF may allow analytic functions to be executed on the matrix data. As an example, a fast Fourier transform function may be executed on the data of table using the syntax:
EXECUTE FUNCTION
INTO VOLATILE ART(DFFT2_RESULTS)
TD_DFFT2(MATRIX_SPEC(TABLE_NAME(MatrixDataSets),
MATRIX ID(LineNo),
    ROW_AXIS(TIMECODE(TimeValue)),
COLUMN_AXIS(SEQUENCE(ReceiverNo)),
PAYLOAD(FIELDS(MAGNITUDE), CONTENT (REAL))),
    FUNC_PARAMS(FREQ_STYLE("K_INTEGRAL"),
HUMAN_READABLE(1)),
    OUTPUT_FMT(CONTENT(AMPL_PHASE)));
FIGS. 13A-B show the results set 1300 placed in the volatile ART DFFT_RESULTS. As shown, the MATRIX_ID field is carried through the results field to maintain identification throughout use of wavelets within a results set. Row_I and Column_I may be of defined data types and the meaning of the returned values may be based on that set in the AF function itself.

FIG. 14 is an operational flow diagram of execution of an AF function by the RDBMS 102. In one example, the RDBMS 102 may receive an AF function (AFF) call (1400) in accordance with the AF syntax. The RDBMS 102 may identify a database table, such as table 404, to extract data from (1402). The RDBMS 102 may determine if a 1-D array (series) is identified in the AFF call (1404). If not, the RDBMS 102 may determine a 2-D array (matrix) is identified in the AFF call (1406). If a series is identified in the AFF call, the RDBMS 102 may identify the type of series (SEQUENCE or TIMECODE), the table column serving as the ROW_AXIS, and the table column serving as the SERIES_ID (1408). The input data may be ordered accordingly (1410). If a matrix is identified in the call, the RDBMS 102 may identify the type of series (SEQUENCE or TIMECODE), the table column serving as the ROW_AXIS, the table column serving as the COLUMN_AXIS, and the table column serving as the SERIES ID (1412). The input data may be ordered accordingly (1414). The RDBMS 102 may determine if additional parameters are present in the AFF function call (1416). If so, the parameters may be recognized by the RDBMS 102 (1418) and implemented during execution of the AFF. Once the parameters are recognized or if no additional parameters are present, the RDBMS 102 may execute the AFF on the input data to generate an ordered results set (1420).

The RDBMS 102 may determine if the results set is to be stored in an ART (1422). If so, the RDBMS 102 may determine if the ART is a volatile ART (1424). If so, the results set may be stored in the named volatile output ART according to the AFF call (1426). If no volatile ART exists, the RDBMS 102 may determine if the ART is a persistently-stored ART (1428). If so, the results set may be stored in an output table identified in the AFF (1430). If no volatile ART or persistently-stored ART is identified, an error has occurred and no results are stored. Once the ART or volatile ART has been identified, the RDBMS 102 may determine if any results sets are to be returned (1432). If so, one or more result set layers may be returned in accordance with the AFF call (1434). If no results are to be returned, execution of the AFF is complete.

FIG. 14 is but one example of the operation of the AF in the RDBMS 102. In other examples, the operational flow may be different. For example, the RDBMS 102 may recognize the syntax as either SERIES SPEC or MATRIX SPEC without any decision being made. Moreover, the ART or volatile ART may be declared within the AF function call so that the RDBMS 102 may make take appropriate action in creating a table or other data object to serve as the ART or volatile ART. In other examples, the various features described herein may also be used instead of those described such as the ART_SPEC syntax, for example.

The examples herein have been provided with the context of a relational database system. However, all examples are applicable to various types of data stores, such as file systems or other data stores suitable for organization and processing of data. While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A data store system comprising:
a storage device configured to store a plurality of data store tables;
a plurality of processing units, wherein at least one processing unit from the plurality of processing units is configured to:
receive an analytic function call;
identify, in the analytic function call, at least one column of a data store table on which to execute an analytic function in the analytic function call;
identify, in the analytic function call, an identifier column of the data store table, wherein each row of the at least one column is associated with a common row value of the identifier column;
identify, in the analytic function call, at least one index column of the data store table, wherein each value in the at least one index column identifies an index value on which to index each value of the at least one column with respect to each value of the identifier column;
order values of the at least one column in accordance with the identifier column and the at least one index column;
execute the analytic function on the ordered values to generate a result set; and
order the result set in accordance with the identifier column and the at least one index column.

2. The system of claim 1, wherein the at least one processing units is further configured to:
identify in the analytic function call a data object name;
create the data object according to the data object name, wherein the data object maintains the order of the result set in accordance with the identifier column and the at least one index column;
load the result set in the data object; and
store the data object in the storage device.

3. The system of claim 1, wherein execution of the analytic function generates a plurality of result set layers, wherein each result set layer is individually ordered in accordance with the identifier column and the at least one index column.

4. The system of claim 3, wherein the at least one processing unit is further configured to:
identify, in the analytic function call, a request to return at least one result set layer; and
return the at least one result set layer.

5. The system of claim 1, wherein each value of at least one index column is an integer or float value.

6. The system of claim 1, wherein the at least one index column comprises a plurality of index columns, wherein values at least one of the plurality of index columns serve as a first index and values of at least another one of the plurality of index columns serve as a second index.

7. The system of claim 1, wherein the identifier column comprises a plurality of identifier columns from the data store table.

8. A method comprising:
receiving, with at least one processing unit from a plurality of processing units, an analytic function call;
identifying, with the at least one processing unit, in the analytic function call, at least one column of a data store table on which to execute an analytic function in the analytic function call;
identifying, with at least one processing unit, in the analytic function call, an identifier column of the data store table, wherein each row of the at least one column is associated with a common row value of the identifier column;
identifying, with at least one processing unit, in the analytic function call, at least one index column of the data store table, wherein each value in the at least one index column identifies an index value on which to index each value of the at least one column with respect to each value of the identifier column;
ordering, with at least one processing unit, values of the at least one column in accordance with the identifier column and the at least one index column;
executing, with at least one processing unit, the analytic function on the ordered values to generate a result set, and
ordering, with at least one processing unit, the result set in accordance with the identifier column and the at least one index column.

9. The method of g, further comprising:
identifying, with at least one processing unit, in the analytic function call a data object name;
creating, with at least one processing unit, the data object according to the data object name, wherein the data object maintains the order of the result set in accordance with the identifier column and the at least one index column;
loading, with at least one processing unit, the result set in the data object; and
storing, with at least one processing unit, the data object in the storage device.

10. The method of claim 8, wherein execution of the analytic function generates a plurality of result set layers, wherein each result set layer is individually ordered in accordance with the identifier column and the at least one index column.

11. The method of claim 10 further comprising:
identifying, with at least one processing unit, in the analytic function call, a request to return at least one result set layer; and
returning, with at least one processing unit, the at least one result set layer.

12. The system of claim 8, wherein each value of at least one index column is an integer or float value.

13. The method of claim 8, wherein the at least one index column comprises a plurality of index columns, wherein values at least one of the plurality of index columns serve as a first index and values of at least another one of the plurality of index columns serve as a second index.

14. The system of claim 1, wherein the identifier column comprises a plurality of identifier columns from the data store table.

15. A computer-readable medium encoded with a plurality of instructions executable by a processor, the plurality of instructions comprising:

instructions to receive an analytic function call;

instructions to identify, in the analytic function call, at least one column of a data store table on which to execute an analytic function in the analytic function call;

instructions to identify, in the analytic function call, an identifier column of the data store table, wherein each row of the at least one column is associated with a common row value of the identifier column;

instructions to identify, in the analytic function call, at least one index column of the data store table, wherein each value in at the at least one index column identifies an index value on which to index each value of the at least one column with respect to each value of the identifier column; and instructions to order values of the at least one column in accordance with the identifier column and the at least one index column;

instructions to execute the analytic function on the ordered values to generate a result set; and instructions to order the result set in accordance with the identifier column and the at least one index column.

16. The computer-readable medium of claim 15, wherein the plurality of instructions further comprises:

instructions to identify, in the analytic function call a data object name;

instructions to create the data object according to the data object name, wherein the data object maintains the order of the result set in accordance with the identifier column and the at least one index column;

instructions to load the result set in the data object; and instructions to store the data object in the storage device.

17. The computer-readable medium of claim 15, wherein execution of the analytic function generates a plurality of result set layers, wherein each result set layer is individually ordered in accordance with the identifier column and the at least one index column.

18. The computer-readable medium of claim 17, wherein the plurality of instructions further comprises:

instructions to identify, in the analytic function call, a request to return at least one result set layer; and instructions to return the at least one result set layer.

19. The computer-readable medium of claim 15, wherein each value of at least one index column is an integer or float value.

20. The computer-readable medium of claim 15, wherein the at least one index column comprises a plurality of index columns, wherein values at least one of the plurality of index columns serve as a first index and values of at least another one of the plurality of index columns serve as a second index.

* * * * *